(12) United States Patent
Chiu et al.

(10) Patent No.: US 10,281,885 B1
(45) Date of Patent: May 7, 2019

(54) RECURRENT NEURAL NETWORKS FOR ONLINE SEQUENCE GENERATION

(71) Applicant: Google LLC, Mountain View, CA (US)

(72) Inventors: Chung-Cheng Chiu, Mountain View, CA (US); Navdeep Jaitly, Mountain View, CA (US); Ilya Sutskever, San Francisco, CA (US); Yuping Luo, Beijing (CN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/600,699

(22) Filed: May 19, 2017

Related U.S. Application Data (60) Provisional application No. 62/339,774, filed on May 20, 2016.

(51) Int. Cl.
| | |
|---|---|
| *G05B 13/02* | (2006.01) |
| *G06N 3/04* | (2006.01) |
| *G06F 17/28* | (2006.01) |
| *G10L 15/16* | (2006.01) |

(52) U.S. Cl.
CPC ......... *G05B 13/027* (2013.01); *G06F 17/289* (2013.01); *G06N 3/0445* (2013.01); *G10L 15/16* (2013.01)

(58) Field of Classification Search
CPC .. G05B 13/027; G06F 17/289; G06N 3/0445; G10L 15/16
USPC .......................................................... 706/25
See application file for complete search history.

(56) References Cited

U.S. PATENT DOCUMENTS 10,049,279 B2 * 8/2018 Li ...................... G06K 9/00718

OTHER PUBLICATIONS

Abadi et al. "Tensorflow: Large-scale machine learning on heterogeneous distributed systems," arXiv preprint arXiv1603.04467v2, Mar. 16, 2016, 19 pages.
Bandanau et al. "End-to-end attention-based large vocabulary speech recognition," arXiv preprint arXiv1508.04395v2, Mar. 14, 2016, 8 pages.
Bandanau et al. "Neural Machine Translation by Jointly Learning to Align and Translate" arXiv preprint arXiv1409.0473v7, May 19, 2016, 15 pages.
Chan et al. "Listen, attend and spell," arXiv preprint arXiv 1508.04395v2, Aug. 20, 2015, 16 pages.
Cho et al. "Learning Phrase Representations using RNN Encoder-Decoder for statistical Machine Translation," arXiv preprint arXiv1406.1078v3, Sep. 3, 2014, 15 pages.

(Continued)

*Primary Examiner* — Fernando Hidalgo
(74) *Attorney, Agent, or Firm* — Fish & Richardson P.C.

(57) ABSTRACT

Methods, systems, and apparatus, including computer programs encoded on a computer storage medium, for generating a target sequence from a source sequence. In one aspect, the system includes a recurrent neural network configured to, at each time step, receive am input for the time step and process the input to generate a progress score and a set of output scores; and a subsystem configured to, at each time step, generate the recurrent neural network input and provide the input to the recurrent neural network; determine, from the progress score, whether or not to emit a new output at the time step; and, in response to determining to emit a new output, select an output using the output scores and emit the selected output as the output at a next position in the output order.

20 Claims, 3 Drawing Sheets

(56) References Cited

OTHER PUBLICATIONS

Chorowski et al. "End-to-end Continuous Speech Recognition using Attention-based Recurrent NN: First Results," arXiv preprint arXiv1412.1602v1, Dec. 4, 2014, 10 pages.
Graves et al. "Generating sequences with recurrent neural networks," arXiv preprint arXiv 1308.0850v1, Aug. 4, 2013, 43 pages.
Graves et al. "Neural turing machines," arXiv preprint arXiv 1410.5401v1, Oct. 20, 2014, 26 pages.
Graves et al. "Speech recognition with deep recurrent neural networks," IEEE International Conference on Acoustics, Speech and Signal Processing, May 26, 2013, 5 pages.
Graves et al. "Towards End-to-End Speech Recognition with Recurrent Neural Networks," International Conference on Machine Learning, 2014, 9 pages.
Graves. "Hybrid Speech Recognition with Deep Bidirectional LSTM," IEEE Workshop on Automatic Speech Recognition and Understanding, Dec. 8, 2013, 6 pages.
Jaitly et al. "An online sequence-to-sequence model using partial conditioning," arXiv preprint arXiv 1511.04868v4, Aug. 4, 2016, 10 pages.
Kalchbrenner et al. "Grid long short-term memory," arXiv preprint 1507.01526v3, Jan. 7, 2016, 15 pages.
Levine. "Motor Skill Learning with Local Trajectory Methods," Doctoral dissertation, Stanford University, Mar. 2014, 142 pages.
Li. "Constructing Long Short-Term Memory Based Deep Recurrent Neural Networks for Large Vocabulary Speech Recognition," arXiv preprint arXiv 1410.4281v2, May 11, 2015, 5 pages.
Luo et al. "Learning Online Alignments with Continuous Rewards Policy Gradient," arXiv preprint ArXiv 1608.01281v1, Aug. 3, 2016, 9 pages.
Mnih et al. "Neural variational inference and learning in belief networks," arXiv preprint arXiv 1402.0030v1, Jan. 31, 2014, 10 pages.
Mnih et al. "Recurrent Models of Visual Attention," Advances in neural information processing systems, 2014, 9 pages.
Mohamed et al. "Acoustic modeling using deep belief networks," IEEE Transaction on Audio, Speech and Language Processing, 20(1), Jan. 2012, 10 pages.
Schulman et al. "Gradient estimation using stochastic computation graphs," Advances in Neural Information Processing Systems, 2015, 9 pages.
Sukhbaatar et al. "End-to-end memory networks," Advances in Neural Information Processing Systems, 2015, 9 pages.
Sutskever et al. "Sequence to Sequence Learning with Neural Networks," Advances in neural information processing systems, 2014, 9 pages.
Vinyals et al. "Show and Tell: A Neural Image Caption Generator," IEEE Conference on Computer Vision and Patter Recognition, 2015, 9 pages.
Weston et al. "Memory networks," arXiv preprint arXiv 1410.3916v11, Nov. 29, 2015, 15 pages.
Williams "Simple Statistical Gradient-Following Algorithms for Connectionist Reinforcement Learning," Machine Learning 8.3-4, May 1, 1992, 28 pages.
Xu et al. "Show, Attend and Tell: Neural Image Caption Generation with Visual Attention," International Conference on Machine Learning, 10 pages.
Zaremba and Sutskever, "Reinforcement Learning Neural Turin Machines," arXiv preprint arXiv1505.00521v1, May 4, 2015, 13 pages.

* cited by examiner

RECURRENT NEURAL NETWORKS FOR ONLINE SEQUENCE GENERATION

CROSS REFERENCE TO RELATED APPLICATIONS

This application is a non-provisional of and claims priority to U.S. Provisional Patent Application No. 62/339,774, filed on May 20, 2016, the entire contents of which are hereby incorporated by reference.

BACKGROUND

This specification relates to recurrent neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

In general, one innovative aspect of the subject matter described in this specification can be embodied in systems for generating a target sequence comprising a plurality of outputs arranged according to an output order from a source sequence including a plurality of inputs arranged according to an input order, wherein the systems include a recurrent neural network, wherein the recurrent neural network is configured to, at each of a plurality of time steps, receive a recurrent neural network input for the time step including a current input for the time step and a most recently emitted output from the target sequence; and process the recurrent neural network input to generate (i) a progress score and (ii) a set of output scores; and a subsystem, wherein the subsystem is configured to, at each of the plurality of time steps, generate the recurrent neural network input for the time step and provide the recurrent neural network input as input to the recurrent neural network; determine, from the progress score, whether or not to emit a new output at the time step; and, in response to determining to emit a new output, select an output using the output scores and emit the selected output as the output at a next position in the output order.

Other embodiments of this aspect can optionally include one or more of the following features. In some implementations, the recurrent neural network is a Grid Long Short-Term Memory (LSTM) neural network. In some implementations, the recurrent neural network is a stacked deep LSTM neural network. In some implementations, the recurrent neural network input further includes a progress input indicating whether or not an output was emitted at a time step immediately preceding the time step. In some implementations, the source sequence includes k inputs, wherein k is an integer equal to or greater than one, wherein the plurality of time steps are ordered according to a time step order, and wherein, when i is less than or equal to k, the current input for an i-th time step in the time step order is the i-th input in the input order. In some implementations, i is greater than k, the current input for an i-th time step in the time step order is a last input in the input order. In some implementations, i is greater than k, the current input for an i-th time step in the time step order is a placeholder input.

In some implementations, determining, from the progress score, whether or not to emit a new output at the time step includes sampling from a two-point distribution in accordance with the progress score to select either an emit value or a do not emit value for a binary variable; and determining to emit a new output when the emit value is selected and determining not to emit a new output when the do not emit value is selected. In some implementations, the set of output scores includes a respective score for each output in a vocabulary of possible outputs and a score for an end of sequence output, and wherein selecting an output includes selecting an output having a highest output score. In some implementations, the subsystem is further configured to terminate the output sequence if the selected output is the end of sequence output.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages. A neural network system can perform attention-based sequence-to-sequence processing online. That is, the system can begin generating an output sequence before having processed the entire input sequence. The amount of processing required to perform online sequence-to-sequence tasks such as voice recognition or translation can be decreased and the accuracy of performing such tasks can be increased. A neural network system can use effective attention-based sequence-to-sequence transformation techniques even when the entire input sequence is not available to the system at a particular time step. A neural network system can process previous predictions and previous decisions about whether to predict as an input for a time step to improve the prediction and the decision about whether to predict at that time step.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
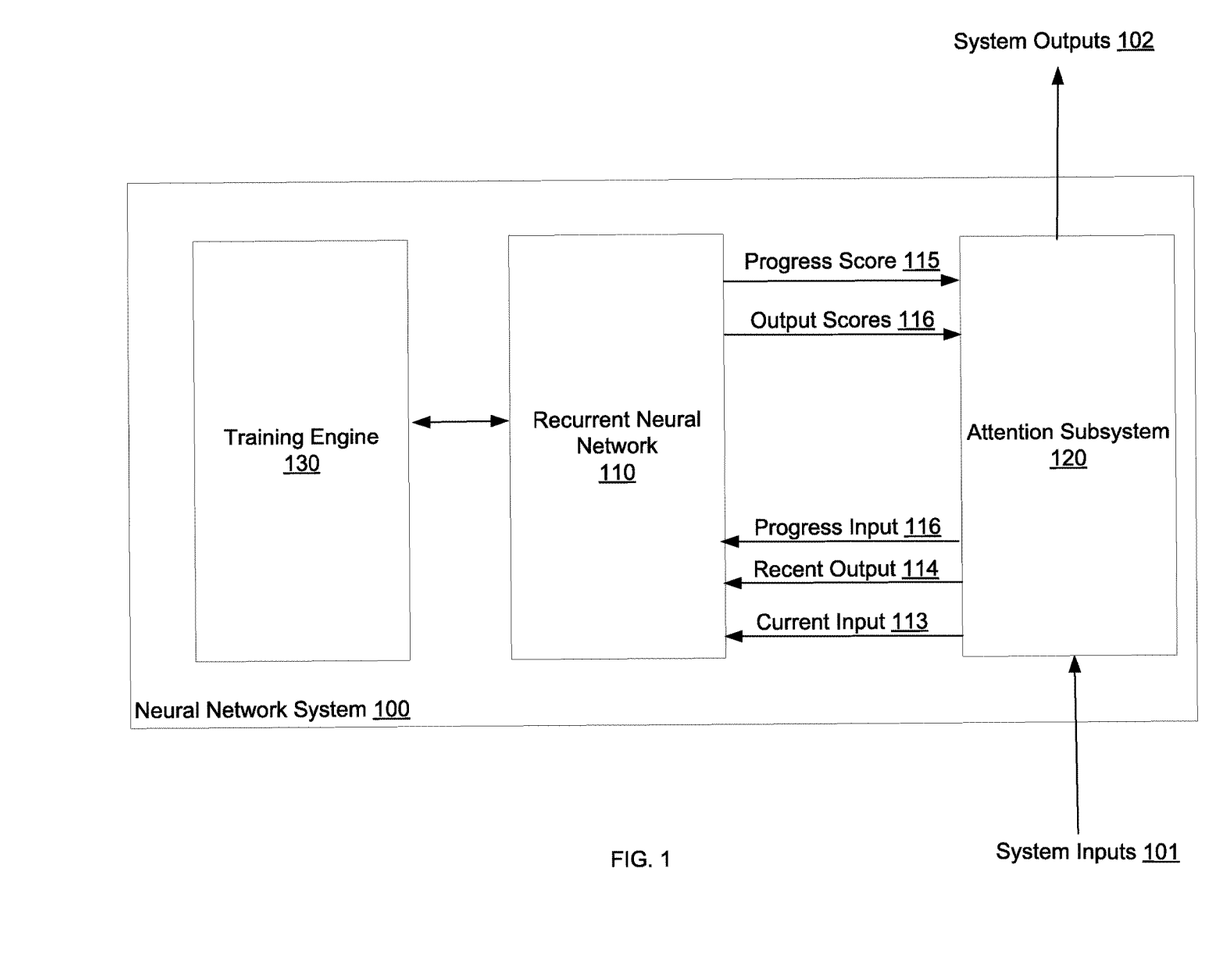
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 receives a sequence of system inputs 101 arranged according to an input order and processes the input sequence 101 to generate a sequence of system outputs 102 arranged according to an output order.

The neural network system 100 can perform any of a variety of tasks that require processing sequential inputs to generate sequential outputs.

For example, if the inputs to the neural network system 100 are a sequence of voice tokens, the outputs of the neural network system 100 may be a sequence of text tokens, where each of the text tokens in the output sequence corresponds to a voice token in the input sequence.

For example, the neural network system 100 may be a neural machine translation system. That is, if the input sequence 101 is a sequence of words in an original language, e.g., a sentence or phrase, the output sequence 102 may be a translation of the input sequence into a target language, i.e., a sequence of words in the target language that represents the sequence of words in the original language.

As another example, the neural network system 100 may be a speech recognition system. That is, if the input sequence 101 is a sequence of audio data representing a spoken utterance, the output sequence 102 may be a sequence of graphemes, characters, or words that represents the utterance, i.e., is a transcription of the input sequence.

As another example, the neural network system 100 may be a natural language processing system. For example, if the input sequence 101 is a sequence of words in an original language, e.g., a sentence or phrase, the output sequence 102 may be a summary of the input sequence in the original language, i.e., a sequence that has fewer words than the input sequence but that retains the essential meaning of the input sequence. As another example, if the input sequence is a sequence of words that form a question, the output sequence can be a sequence of words that form an answer to the question.

As another example, the neural network system 100 may be part of a computer-assisted medical diagnosis system. For example, the input sequence 101 can be a sequence of data from an electronic medical record and the output sequence 102 can be a sequence of predicted treatments. The neural network system 100 includes a recurrent neural network 110, an attention subsystem 120, and a training engine 130.

The recurrent neural network 110 is a neural network that is configured to, at each time step of multiple time steps, receive a network input for the time step and process the network input in accordance with a current internal state of the recurrent neural network 130 to generate a network output and to update the current internal state of the recurrent neural network 110.

The network input for a time step includes a current input 113 in the input sequence 101 and a most recently emitted output 114 in the output sequence 102. In some implementations, the network input also includes a progress input 116. The progress input 116 indicates whether or not an output in the output sequence 102 was emitted by the attention subsystem 102 at the time step that immediately preceded the current time step.

The network output for a time step include a progress score 115 for the time step and a set of output scores 116. The progress score 115 for the time step indicates whether the attention subsystem 120 should emit a new output in the output sequence 102 at the time step. The output scores 116 for the time step can include a score for each of a set of possible outputs at the time step.

In some implementations, the recurrent neural network has a long-short term (LSTM) memory architecture. For example, the recurrent neural network may have a grid LSTM or a stacked deep LSTM architecture.

Examples of recurrent neural networks with LSTM architecture are described in Graves, *Generating Sequences with Recurrent Neural Networks*, at https://arxiv.org/pdf/1308.0850.pdf. Examples of recurrent neural networks with a grid LSTM architecture are described in Kalchbrenner, *Grid Long Short-Term Memory*, at https://arxiv.org/pdf/1507.01526.pdf. Examples of recurrent neural networks with a stacked deep LSTM architecture are described in Li, *Constructing Long Short-Term Memory Based Deep Recurrent Neural Networks for Large Vocabulary Speech Recognition*, at https://arxiv.org/pdf/1410.4281.pdf and Graves, *Hybrid Speech Recognition with Deep Bidirectional LSTM*, at https://www.cs.toronto.edu/~graves/asru_2013.pdf.

Processing network inputs by the recurrent neural network 101 to generate network outputs is described in greater detail below with reference to FIG. 2.

At each time step, the attention subsystem 120 provides the recurrent neural network 110 with the network input for the time step; receives the network output for the time step from the recurrent neural network 110; determines, based on the progress score 115 in the network output, whether to emit a system output for the time step; and, upon determining to emit a system output, generates a system output based on the output scores in the network output and adds the system output to the output sequence 102.

Generally, the input sequence 101 includes k inputs, where k>=1. For each time step i in the time step order, when i<=k, the attention subsystem 120 can select the ith input in the input order as the current input 113 for the time step i.

In some implementations, when i>k, the attention subsystem 120 selects a last input in the input order as the current input 113 for the time step i. In some other implementations, when i>k, the attention subsystem 120 selects a placeholder input as the current input 113 for the time step i.

Generally, the attention subsystem determines whether to emit a system output in accordance with the progress score 115. In some implementations, the attention subsystem determines whether to emit a system output at a time step by sampling from two-point distribution, e.g., a Bernoulli distribution, in accordance with the progress score 115.

The result of the sampling is a value of a binary variable, where one of the two possible values of the variable, e.g., 1, indicates that the attention subsystem 120 should emit a new output, while the other possible value of the variable indicates that the attention subsystem 120 should not emit a new output. The attention subsystem 120 determines to emit a system output at a time step in the output sequence if the value of the binary value indicates that the attention subsystem 120 should emit a new output and determines not to emit a system output in the output sequence if the value of the binary variable indicates that the attention subsystem 120 should not emit a new output.

If the attention subsystem 120 determines to emit a system output in the output sequence 102 for a time step, the attention subsystem 120 uses the output scores 116 to determine which output of the set of possible outputs to emit at each time step. In some implementations, the attention subsystem 120 selects the output having the highest output score. In some other implementations, the attention subsystem 120 selects an output by sampling from the set of possible outputs in accordance with the output scores 116, i.e., so that each output is sampled with a likelihood that is defined by the output score for the output.

In some implementations, the output scores 116 include a respective score for each output in the set of possible outputs, e.g., a vocabulary, that includes multiple tokens, e.g., multiple words, and a predetermined special end of sequence output. In some of these implementations, the attention subsystem 120 is configured to terminate the output sequence 102 if the selected output at a given time step is the special end of sequence output.

Collectively, the recurrent neural network 110 and the attention subsystem 120 enable the neural network system 100 to generate the output sequence 102 in an online manner. In particular, the attention subsystem 120 can begin generating outputs in the output sequence 102 before the entire input sequence 101 has been processed by the recurrent neural network 110. At the time same time, the neural network system 100 can determine which inputs a given output in the output sequence 102 should be conditioned on, i.e., based on the progress scores. This technique is known as an attention-based approach to generating an output sequence. Thus, the neural network system 100 can use attention-based approaches to perform online sequence-to-sequence transformations. This is in contrast to conventional attention-based sequence-to-sequence approaches that require the entire input sequence 101 to have been processed in order to employ attention and thus cannot perform online sequence-to-sequence transformation.

The training engine 130 is configured to train the recurrent neural network 110 to generate network outputs based on network inputs. In some implementations, the training engine 130 trains the recurrent neural network 110 to maximize a received reward using reinforcement learning.

Training the recurrent neural network 101 to generate network outputs based on network inputs using reinforcement learning is described in greater detail below with reference to FIG. 3.

Figure 2:
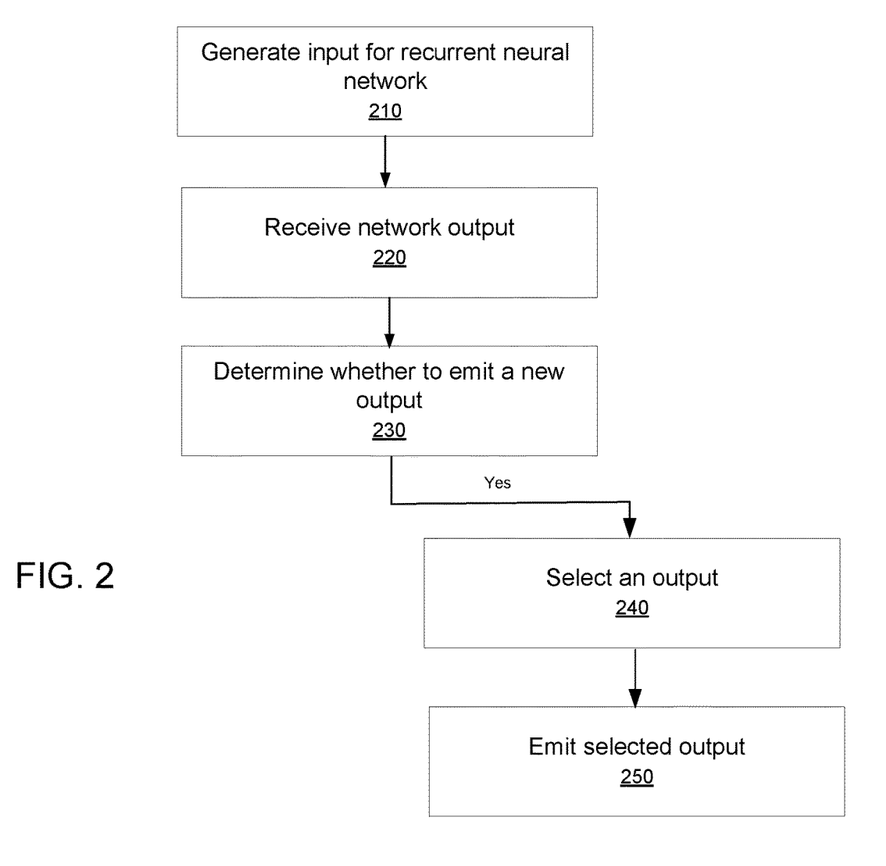
FIG. 2 is a flow diagram of an example process for processing network inputs to generate network outputs at each time step

FIG. 2 is a flow diagram of an example process for generating an output sequence from an input sequence. For convenience, the process 200 will be described as being performed by a system of one or more computers located in one or more locations. For example, a neural network system, e.g., neural network system 100 of FIG. 1, appropriately programmed in accordance with this specification, can perform the process 200.

The system can generate the output sequence from the input sequence by repeating the process 200 for multiple time steps, i.e., until a special end of sequence output has been selected or some other termination criteria have been satisfied.

The system generates a network input for a recurrent neural network for the time step (210).

The network input can include a concentration of a current input in the input sequence and a most recently emitted output from the target sequence. In some implementations, the network input also includes a progress input that indicates whether or not an output was emitted at a time step immediately preceding the time step.

The system receives a network output for the time step from the recurrent neural network, i.e., the network output generated by the recurrent neural network by processing the network input for the time step (220). The system output includes a progress score and a set of output scores.

The system determines, from the progress score, whether or not to emit a new output at the time step (230). In some implementations, the system samples from a two-point distribution, e.g., a Bernoulli distribution, in accordance with the progress score and uses the result of the sampling to determine whether to emit a new output at the time step.

If the system determines to emit a new output at the time step, the system selects an output using the output scores (240) and emits the selected output as the next output in the target sequence (250). In some implementations, the system selects an output in a set of possible outputs that has a highest output score. In some other implementations, the system samples from the set of possible outputs according to the output scores and uses the result of the sampling to select an output.

Figure 3:
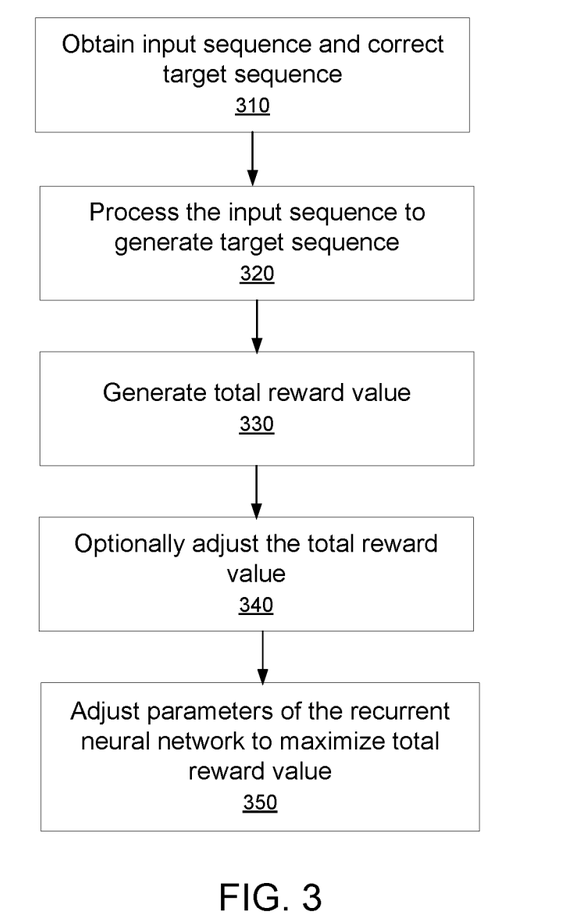
FIG. 3 is a flow diagram of an example process for training a recurrent neural network to process network inputs to generate network outputs using reinforcement learning.

FIG. 3 is a flow diagram of an example process for training a recurrent neural network to process network inputs to generate network outputs using reinforcement learning. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system obtains an input sequence and a correct target sequence that corresponds to the input sequence (310).

The system processes the input sequence to generate a target sequence (320). Generating an output sequence is described above with reference to FIG. 2.

In some implementations, during the generation of the output sequence, the system automatically determines to emit an output in response to determining that a number of outputs yet to be emitted to generate the target sequence that matches the correct target sequence is greater than or equal to a number of inputs from the input sequence that have yet to be provided as input to the recurrent neural network. In other words, for a correct target sequence of size c when the system has already emitted o outputs in the target sequence after processing i inputs in the input sequence, if $(c-o) >= i$, the system does not use the progress score for the time step to determine whether to emit a new output and proceeds to emit an output according to the output scores regardless of the value of the progress. This avoids a situation where the recurrent neural network, during training, consistently refuses to emit outputs to maximize a reward.

The system generates a total reward value based on the target sequence and the correct target sequence (330).

In some implementations, for each time step during the generation of the output sequence, the system determines a reward measure for the time step based on the particular output in the target sequence emitted at the time step and a target output of the correct target output sequence corresponding to the particular output if the system emits an output in the time step. Otherwise, if the system does not emit an output in the time step, the system determines a reward of zero for the time step. The system combines reward measures of each time step to generate the total reward value.

In some implementations, the system determines the total reward value based on performing the operations of the following two equations at each time step i:

$$R = R + \hat{b}_i \cdot \text{softmax\_logprob}(d_i, y'_i)$$
$$\text{softmax\_logprob}(d_i, y'_i) = \sum_k \log(d_{ik}) y'_{ik}$$

where R is the total reward value, $\hat{b}_i$ is binary value indicating if an output is emitted at the time step i, $d_i$ is a set of output scores for possible outputs for the time step i, $y'_i$ is a set of correct target output scores for the possible outputs for the time step i, and k ranges over elements of $d_i$ and $y_i$.

The system optionally adjusts the total reward value (340).

In some implementations, the system applies one or more variance reduction functions to the total reward value. Examples of variance reduction functions include functions that apply centering and/or Rao-Blackwellization.

In some implementations, the system adds an entropy penalty to the total reward value that penalizes the recurrent neural network for generating overly confident action scores. Examples of entropy penalty functions are described in Levine, *Motor Skill Learning with Local Trajectory Methods*, at https://people.eecs.berkeley.edu/~svlevine/papers/thesis.pdf and Williams, *Simple Statistical Gradient-Following Algorithms for Connectionist Reinforcement Learning*, at http://www-anw.cs.umass.edu/~barto/courses/cs687/williams92simple.pdf.

The system adjusts the values of the parameters of the recurrent neural network using the total reward value (350). Generally, the system uses a reinforcement learning technique to adjust the values to maximize expected reward. In some implementations, the system adjusts the values of the parameters of the recurrent neural network using the received reward in accordance with a policy gradient technique. Example policy gradient techniques are described in Mnih et al., *Recurrent Models of Visual Attention*, available at https://papers.nips.cc/paper/5542-recurrent-models-of-visual-attention.pdf and Zaremba and Sutskever, *Reinforcement Learning Neural Turing Machines*, available at https://arxiv.org/pdf/1505.00521.pdf.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer system for online speech recognition configured to generate a target sequence comprising a plurality of outputs arranged according to an output order from a source sequence comprising a plurality of inputs arranged according to an input order, wherein the plurality of inputs include voice tokens and the plurality of outputs include text tokens, the computer system comprising:

a recurrent neural network implemented by one or computers, wherein the recurrent neural network is configured to, at each of a plurality of time steps:

receive a recurrent neural network input for the time step comprising (i) a current input for the time step, (ii) a most recently emitted output from the target sequence, and (iii) a current internal state of the recurrent neural network; and process the recurrent neural network input in accordance with the current internal state of the recurrent neural network to generate (i) a progress score and (ii) a set of output scores; and a subsystem implemented by the one or more computers, wherein the subsystem is configured to: at each of the plurality of time steps and beginning before the last input in the input order is received:

generate the recurrent neural network input for the time step and provide the recurrent neural network input as input to the recurrent neural network;

determine, from the progress score, whether or not to emit a new output at the time step;

in response to determining to emit a new output:
select an output using the output scores;
emit the selected output as the output at a next position in the output order; and
update the current internal state of the recurrent neural network; and in response to determining not to emit a new output:
update the current internal state of the recurrent neural network without emitting a new output.

2. The system of claim 1, wherein the recurrent neural network is a Grid Long Short-Term Memory (LSTM) neural network.

3. The system of claim 1, wherein the recurrent neural network is a stacked deep LSTM neural network.

4. The system of claim 1, wherein the recurrent neural network input further comprises a progress input indicating whether or not an output was emitted at a time step immediately preceding the time step.

5. The system of claim 1, wherein the source sequence comprises k inputs, wherein k is an integer equal to or greater than one, wherein the plurality of time steps are ordered according to a time step order, and wherein, when i is less than or equal to k, the current input for an i-th time step in the time step order is the i-th input in the input order.

6. The system of claim 5, when i is greater than k, the current input for an i-th time step in the time step order is a last input in the input order.

7. The system of claim 5, when i is greater than k, the current input for an i-th time step in the time step order is a placeholder input.

8. The system of claim 1, wherein determining, from the progress score, whether or not to emit a new output at the time step comprises:
sampling from a two-point distribution in accordance with the progress score to select either an emit value or a do not emit value for a binary variable; and
determining to emit a new output when the emit value is selected and determining not to emit a new output when the do not emit value is selected.

9. The system of claim 1, wherein the set of output scores includes a respective score for each output in a vocabulary of possible outputs and a score for an end of sequence output, and wherein selecting an output comprises selecting an output having a highest output score.

10. The system of claim 9, wherein the subsystem is further configured to terminate the output sequence if the selected output is the end of sequence output.

11. A computer-implemented method for online speech recognition to generate a target sequence comprising a plurality of outputs arranged according to an output order from a source sequence comprising a plurality of inputs arranged according to an input order, wherein the plurality of inputs include voice tokens and the plurality of outputs include text tokens, the method comprising:
before the last input in the input order is received:
generating a recurrent neural network input for a time step and providing the recurrent neural network input as input to the recurrent neural network, wherein the recurrent neural network is configured to, at each of a plurality of time steps:
receive the recurrent neural network input for the time step comprising (i) a current input for the time step, (ii) a most recently emitted output from the target sequence, and (iii) a current internal state of the recurrent neural network; and
process the recurrent neural network input in accordance with the current internal state of the recurrent neural network to generate (i) a progress score and (ii) a set of output scores before the last input in the input order is received;

determining, from the progress score, whether or not to emit a new output at the time step; and in response to determining to emit a new output:
selecting an output using the output scores;
emitting the selected output as the output at a next position in the output order, and
updating the current internal state of the recurrent neural network.

12. The method of claim 11, wherein the recurrent neural network is a Grid Long Short-Term Memory (LSTM) neural network.

13. The method of claim 11, wherein the recurrent neural network is a stacked deep LSTM neural network.

14. The method of claim 11, wherein the recurrent neural network input further comprises a progress input indicating whether or not an output was emitted at a time step immediately preceding the time step.

15. The method of claim 11, wherein the source sequence comprises k inputs, wherein k is an integer equal to or greater than one, wherein the plurality of time steps are ordered according to a time step order, and wherein, when i is less than or equal to k, the current input for an i-th time step in the time step order is the i-th input in the input order.

16. The method of claim 15, when i is greater than k, the current input for an i-th time step in the time step order is a last input in the input order.

17. The method of claim 15, when i is greater than k, the current input for an i-th time step in the time step order is a placeholder input.

18. The method of claim 11, wherein determining, from the progress score, whether or not to emit a new output at the time step comprises:
sampling from a two-point distribution in accordance with the progress score to select either an emit value or a do not emit value for a binary variable; and
determining to emit a new output when the emit value is selected and determining not to emit a new output when the do not emit value is selected.

19. The method of claim 11, wherein the set of output scores includes a respective score for each output in a vocabulary of possible outputs and a score for an end of sequence output, and wherein selecting an output comprises selecting an output having a highest output score.

20. A computer storage medium encoded with instructions that, when executed by one or more computers, cause the one or more computers to perform online speech recognition operations for generating a target sequence comprising a plurality of outputs arranged according to an output order from a source sequence comprising a plurality of inputs arranged according to an input order, wherein the plurality of inputs include voice tokens and the plurality of outputs include text tokens, the operations comprising:
before the last input in the input order is received:
generating a recurrent neural network input for a time step and providing the recurrent neural network input as input to the recurrent neural network, wherein the recurrent neural network is configured to, at each of a plurality of time steps:

receive the recurrent neural network input for the time step comprising (i) a current input for the time step, (ii) a most recently emitted output from the target sequence, and (iii) a current internal state of the recurrent neural network; and process the recurrent neural network input in accordance with the current internal state of the recurrent neural network to generate (i) a progress score and (ii) a set of output scores before the last input in the input order is received;

determining, from the progress score, whether or not to emit a new output at the time step; and in response to determining to emit a new output:

selecting an output using the output scores;

emitting the selected output as the output at a next position in the output order, and updating the current internal state of the recurrent neural network.

\* \* \* \* \*

UNITED STATES PATENT AND TRADEMARK OFFICE
CERTIFICATE OF CORRECTION

| | |
|---|---|
| PATENT NO. | : 10,281,885 B1 |
| APPLICATION NO. | : 15/600699 |
| DATED | : May 7, 2019 |
| INVENTOR(S) | : Chiu et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 47 days.

Signed and Sealed this
Twenty-sixth Day of May, 2020

Andrei Iancu
*Director of the United States Patent and Trademark Office*